UNITED STATES PATENT OFFICE.

JOHN W. FRIES, OF SALEM, NORTH CAROLINA.

PROCESS OF TANNING.

SPECIFICATION forming part of Letters Patent No. 343,167, dated June 8, 1886.

Application filed February 11, 1886. Serial No. 191,600. (Specimens.)

*To all whom it may concern:*

Be it known that I, JOHN W. FRIES, of Salem, in the county of Forsyth and State of North Carolina, have invented certain new and useful Improvements in the Process of Tanning, of which the following is a specification.

My invention relates to mineral tanning and treating of hides in the manufacture of leather, and is designed as an improvement upon the process or method set forth and claimed in an application filed by me May 11, 1885, and designated by Serial No. 165,106. The process is precisely the same as that before set forth up to the point of currying, in which operation I now make use of castor-oil and alcohol instead of the oils or fatty substances hitherto employed.

In order that the invention may be fully understood without need of reference to other papers, I will describe the process set forth in my aforesaid former application, up to the point where the improvement is introduced.

The hides, previously limed and unhaired in the ordinary way for tanning with oak bark or by sweating, or by the aid of sulphide of sodium or other process, are placed in a bath of carbonate of iron, where they should be suspended as in a "rocker-handler" for two days, more or less, and agitated from time to time. For this bath I employ carbonate of protoxide of iron dissolved in water, and it is not material from what source or agents this is obtained, nor is it important to observe closely any stated quantity of the chemicals used to a given quantity of water. The water, even when saturated with carbonic acid, will dissolve but a limited quantity of the carbonate; but for this reason there should always be an ample supply of undissolved sulphate of iron in the bottom of the tank. If carbonated well-water is used, which contains usually a considerable amount of carbonic acid in solution naturally, a good working proportion of chemicals would be: green copperas, three pounds per cubic foot of water; sal-soda, three pounds per cubic foot of water. To this a small quantity of sulphuric acid may be advantageously added, so as to saturate the water with carbonic acid. If the water used contains but little free carbonic acid, I prefer a bath containing green copperas, three pounds per cubic foot of water; bicarbonate of soda, two pounds per cubic foot of water. To this liquid may be added sugar in the proportion of, say, one-half pound of sugar to each pound of copperas, for the purpose of preventing the protoxide of iron from passing into the sesquioxide; but the use of saccharine matter is not essential to the process.

In the constant use of the same vat, with additions of green copperas and soda from time to time, the liquor soon becomes supersaturated with sulphate of soda, and it therefore becomes desirable to allow the liquor to settle from time to time and to draw off the clear portion, which contains the sulphate of soda in solution, saving the carbonate-of-iron precipitate at the bottom of the vat and filling up with clear water. To this is added enough sulphuric acid to cause it to effervesce, and it should be kept near the point of effervescence by further additions of sulphuric acid every day or two, more or less; but care should be taken not to add the acid in such quantity, nor to continue the effervescing action so long as to drive off the carbonic acid of the carbonate. The liquor should be kept constantly saturated with carbonic acid. After the hides have been fully acted on by this carbonate solution, which requires only two or three days, I transfer them to another liquor consisting of green copperas and common salt dissolved in water. It is not material that these salts be in very exact and definite proportions to each other or to the quantity of water in which they are dissolved; but in practice no disadvantage is found in employing a strong solution, and as there is no waste or deterioration I find it advisable to make the solution strong to insure sufficient action. I have therefore used in practice, green copperas, twenty-five to forty pounds per cubic foot of water; common salt, fifteen to twenty-five pounds per cubic foot of water. In this as in the first liquor it is desirable to have the hides suspended as in a rocker-handler, and agitated from time to time, so that the liquor shall have free access to and come into contact with all parts of the hide. Two or three days in this liquor are sufficient to complete the tanning. When taken from this liquor, the hides do not have the appearance of leather tanned by ordinary processes, but on being hung up to dry the iron throughout the body of the hide becomes thoroughly oxidized, and the leather becomes firm, fibrous, and of a yellowish-brown color. The currying of this leather may be similar to that of bark-tanned leather in a general way, but must be varied somewhat as to details. Thus I find that ordinary tanner's fish-oil is readily absorbed by leather tanned as above, but tends to make it hard and dark and glazes its surface, giving the appearance of a coating of varnish.

As stated in my former application, a mixture of beef-tallow with paraffine-oil answers well, and hogs' lard and cotton-seed oil also give good results. After various experiments I have found, however, that castor-oil and alcohol mixed together give results superior to any other preparation or substances known to me for currying and finishing hides tanned in the manner above set forth.

As stated in my former application, the proportions of the different ingredients or substances used may be varied, and this applies to the castor-oil and alcohol as well as to other matters, the proportions and quantities of these latter depending somewhat upon the purposes or uses for which the leather is designed.

The peculiar advantage of the castor-oil and alcohol preparation consists in the fact that it will penetrate the leather while the latter is drying, whereas, with the exception of glycerine, other substances have been found incapable of so doing. Glycerine is so hygroscopic that in some conditions of the atmosphere leather treated with it becomes quite wet. Until the present improvement in my process it was found necessary, therefore, to first dry the hides after taking them from the copperas liquor in solution, and to apply the oil thereto after the drying was completed. In many cases the leather in drying became harsh and brittle, and no subsequent treatment would restore its pliability; but by employing the castor-oil and alcohol to the hides as they are taken from the copperas solution I entirely obviate the difficulties previously encountered.

Having thus described my invention, what I claim is—

1. The step in the treatment of hides which have been previously treated in solutions containing, respectively, carbonate of iron and copperas and common salt dissolved in water, which consists in applying to them a mixture of castor-oil and alcohol.

2. The method of treating leather after treatment in solutions containing, respectively, carbonate of iron and green copperas and salt, which consists in applying to said hides while they are wet with the last solution a mixture of castor-oil and alcohol.

JOHN W. FRIES.

Witnesses:
A. F. PFOHL,
C. T. PFOHL.